(12) United States Patent
Kato et al.

(10) Patent No.: US 10,801,830 B2
(45) Date of Patent: Oct. 13, 2020

(54) IMAGING APPARATUS AND IMAGING METHOD

(71) Applicant: SCREEN HOLDINGS CO., LTD., Kyoto (JP)

(72) Inventors: Keisuke Kato, Kyoto (JP); Naoki Ishikawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/467,356

(22) PCT Filed: Nov. 24, 2017

(86) PCT No.: PCT/JP2017/042181
§ 371 (c)(1),
(2) Date: Jun. 6, 2019

(87) PCT Pub. No.: WO2018/123377
PCT Pub. Date: Jul. 5, 2018

(65) Prior Publication Data
US 2020/0096312 A1    Mar. 26, 2020

(30) Foreign Application Priority Data

Dec. 26, 2016  (JP) .................................. 2016-250968

(51) Int. Cl.
*G01B 9/02* (2006.01)
*G01N 21/55* (2014.01)

(52) U.S. Cl.
CPC ..... *G01B 9/02091* (2013.01); *G01B 9/02084* (2013.01); *G01N 21/55* (2013.01)

(58) Field of Classification Search
CPC ............ G01B 9/02091; G01B 9/02084; G01B 9/02044; G01B 9/02063; G01B 9/02064;
(Continued)

(56) References Cited

U.S. PATENT DOCUMENTS 6,172,752 B1   1/2001  Haruna et al.
7,710,577 B2   5/2010  Yatagai et al.
(Continued)

FOREIGN PATENT DOCUMENTS

EP   3299761 A1    3/2018
JP   10-325795 A  12/1998
(Continued)

OTHER PUBLICATIONS

International Search Report issued in corresponding International Patent Application No. PCT/JP2017/042181, dated Feb. 20, 2018, with English Translation.
(Continued)

*Primary Examiner* — Tarifur R Chowdhury
*Assistant Examiner* — Jonathon Cook
(74) *Attorney, Agent, or Firm* — McDermott Will & Emery LLP

(57) ABSTRACT

The present invention aims to obtain a tomographic image free from image noise due to reflection on a container wall surface and having a good image quality by a simple configuration. In a FD-OCT imaging apparatus which images an imaging object stored in a container having an optical transparent wall part tomographically, when the focal depth is set such that a distance D from a first surface Sa of the wall part on the side of the imaging object to a focal point FP of the objective optical system is smaller than a predetermined threshold value smaller than a thickness T of the wall part, the distance between a second surface Sb of the wall part on a side opposite to the imaging object out of the wall surfaces and a reference plane which is perpendicular to the optical path of the illumination light and to which an optical path length is equal is set a value equal to the thickness of the wall part.

15 Claims, 10 Drawing Sheets

(58) Field of Classification Search
CPC ...... G01N 21/55; A61B 3/102; A61B 5/0066; A61B 5/0073
See application file for complete search history.

(56) References Cited

U.S. PATENT DOCUMENTS

| | | | |
|---|---|---|---|
| 8,274,660 B2 * | 9/2012 | Sugita | G01B 9/02048 356/479 |
| 2007/0009935 A1 | 1/2007 | Joo et al. | |
| 2008/0002183 A1 | 1/2008 | Yatagai et al. | |
| 2011/0096291 A1 | 4/2011 | Buckland et al. | |
| 2015/0092196 A1 | 4/2015 | Osawa | |
| 2015/0260503 A1 | 9/2015 | Osawa et al. | |
| 2016/0054116 A1 | 2/2016 | Khomenko et al. | |
| 2016/0216501 A1 | 7/2016 | Cable et al. | |
| 2016/0265899 A1 | 9/2016 | Minemura et al. | |

FOREIGN PATENT DOCUMENTS

| | | |
|---|---|---|
| JP | 2006-052954 A | 2/2006 |
| JP | 2008-541096 A | 11/2008 |
| JP | 2010-164574 A | 7/2010 |
| JP | 2012-202761 A | 10/2012 |
| JP | 2015-072152 A | 4/2015 |
| JP | 2015-175678 A | 10/2015 |
| JP | 2016-169948 A | 9/2016 |
| JP | 2016-188795 A | 11/2016 |

OTHER PUBLICATIONS

Joy P Dunkers et al: "Single cell viability measurements in 3D scaffolds usinglabel free imaging by optical aoherence microscopy", Biomaterials, Elsevier, Amsterdam, NL, vol. 33, No. 7, Nov. 22, 2011 (Nov. 22, 2011), pp. 2119-2126.

Extended European Search Report issued in corresponding European Patent Application No. 17885570.6-1020, dated Apr. 15, 2020.

* cited by examiner $2R = D - \Delta + 2T$
$\therefore R = (D - \Delta)/2 + T \cdots$ (1a)

$2R = D - 2\Delta + 2T$
$\therefore R = D/2 - \Delta + T \cdots$ (1b)

IMAGING APPARATUS AND IMAGING METHOD

CROSS REFERENCE

This application is the U.S. National Phase under 35 US.C. § 371 of International Application No. PCT/JP2017/042181, filed on Nov. 24, 2017, which claims the benefit of Japanese Application No. 2016-250968, filed on Dec. 26, 2016, the entire contents of each are hereby incorporated by reference.

TECHNICAL FIELD

This invention relates to a technique for imaging by detecting an interference light component of reflected light from an imaging object and reference light and particularly to a technique for imaging an imaging object carried in a carrier having optical transparency.

BACKGROUND ART

In technical fields of medicine and biochemistry, samples carried in an appropriate carrier such as cells and microorganisms cultured in a container are observed. Techniques for imaging cells and the like using a microscope or the like are proposed as methods for observation without affecting the cells and the like to be observed. One of such techniques utilizes an optical coherence tomography technique. In this technique, low-coherence light emitted from a light source is caused to be incident as illumination light on an imaging object and interference light of reflected light (signal light) from the imaging object and reference light having a known optical path length is detected, whereby an intensity distribution in a depth direction of the reflected light from the imaging object is obtained for tomographic imaging.

Out of these, a technique for obtaining a reflected light intensity distribution in a depth direction by causing signal light including a wide band component and reference light to interfere with each other and Fourier-transforming a spectrum of the reference light is called a Fourier domain optical coherence tomography imaging technique (FD-OCT). In the FD-OCT technique, since a wavelength in a spectrum of interference light becomes information corresponding to a depth direction of an imaging object, tomographic information of the imaging object in a depth of field of an optical system can be collectively obtained and high-speed imaging is possible.

In the FD-OCT technique, it is known that noise called complex conjugate noise is generated in an image of an imaging object. This unavoidably occurs due to the principle of transforming a spectrum of interference light into a reflected light intensity distribution in a depth direction by a Fourier transform. A technique described in PTL 1 is, for example, known as a technique for eliminating the influence of such noise. This technique is designed to cause two reference lights having different optical path lengths to interfere with signal light while being switched by a chopper in order to solve a problem that a phase shift method, which is a prior art for canceling complex conjugate noise, requires a plurality of number of times of imaging.

CITATION LIST

Patent Literature

[PTL 1] JP2010-164574A

SUMMARY

Technical Problem

If a cell or the like carried in a container is an imaging object, imaging may be performed via a wall part (e.g. bottom part) of the optically transparent container. In such a case, since a container wall surface acts as a strong reflection surface, complex conjugate noise due to reflected light from the container wall surface is superimposed on a tomographic image. Depending on the setting of a reference plane, a required image of the imaging object and a complex conjugate image of the container wall surface may overlap, thereby causing a problem that accurate tomographic information of the imaging object cannot be obtained.

The noise removal method of the above prior art is thought to exhibit a certain effect also in such a case. However, since the case of strong reflection from the container wall part is not supposed, effectiveness of this case is unclear. Further, a special apparatus configuration having a plurality of reference systems is necessary, which causes a problem that the apparatus becomes complicated, enlarged and expensive. From this, it is desired to establish a technique capable of suppressing the influence of complex conjugate noise due to reflected light from a container wall surface without requiring such a complicated apparatus configuration.

Solution to Problem

This invention was developed in view of the above problems and aims to provide a technique for imaging an imaging object in a container utilizing the interference of reflected light from the imaging object and reference light, the technique being capable of obtaining a tomographic image free from image noise due to reflection on a container wall surface and having a good image quality by a simple configuration.

To achieve the above object, one aspect of this invention is directed to an imaging apparatus for tomographically imaging an imaging object stored in a container having an optically transparent wall part, the imaging apparatus including an imaging unit for causing one branch light branched from low coherence light in a wide band emitted from a light source to be incident as illumination light on the imaging object via the wall part, detecting interference light generated by the interference of signal light obtained by condensing reflected light from the imaging object emitted via the wall part by an objective optical system and reference light generated from another branch light and outputting an interference signal corresponding to the detected interference light, a signal processor for obtaining a reflected light intensity distribution of the imaging object in an incident direction of the illumination light by Fourier-transforming a spectrum of the interference light based on the interference signal and generating a tomographic image from the reflected light intensity distribution, and a controller for changing and setting a focal depth in the incident direction of the objective optical system on the imaging object and an optical path length of the reference light. When the focal depth is set such that a distance from a first surface of the wall part on the side of the imaging object to a focal point of the objective optical system is smaller than a predetermined threshold value smaller than a thickness of the wall part, the controller sets the optical path length of the reference light to a value equal to an optical path length of the illumination light to the first surface.

Further, to achieve the above object, another aspect of this invention is directed to an imaging method for tomographically imaging an imaging object stored in a container having an optically transparent wall part, the imaging method including a step of causing one branch light branched from low coherence light in a wide band emitted from a light source to be incident as illumination light on the imaging object via the wall part, detecting interference light generated by the interference of signal light obtained by condensing reflected light from the imaging object emitted via the wall part by an objective optical system and reference light generated from another branch light and outputting an interference signal corresponding to the detected interference light, and a step of obtaining a reflected light intensity distribution of the imaging object in an incident direction of the illumination light by Fourier-transforming a spectrum of the interference light based on the interference signal and generating a tomographic image from the reflected light intensity distribution. A focal depth in the incident direction of the objective optical system on the imaging object and an optical path length of the reference light can be changed and set and, when the focal depth is set such that a distance from a first surface of the wall part on the side of the imaging object to a focal point of the objective optical system is smaller than a predetermined threshold value smaller than a thickness of the wall part, the optical path length of the reference light is set to a value equal to an optical path length of the illumination light to the first surface.

An imaging principle in this invention relies on an FD-OCT technique for obtaining the reflected light intensity distribution in a depth direction by causing the signal light including a wide band component and the reference light to interfere with each other and Fourier-transforming the spectrum of the interference light. In FD-OCT imaging via the container wall part, complex conjugate images of a surface on a side close to the imaging object and another surface on a side opposite to the imaging object across the surface, out of the surface of the wall part, may overlap with an image of the imaging object to possibly become noise.

The complex conjugate image of the container wall surface appears at a position conjugate with a position where an image of the container wall surface appears, i.e. symmetrical with this position with respect to a reference plane specified by the optical path length of the reference light. Accordingly, that appearing position depends on the setting of the reference plane. Thus, it is also thought to distance the complex conjugate image of the container wall surface from the image of the imaging object by sufficiently separating the reference plane from the imaging object. However, it is desirable to set the reference plane near the imaging object in terms of image quality. More specifically, a focal plane of the objective optical system for condensing the reflected light from the imaging object and the reference plane are preferably as close to each other as possible.

Accordingly, in the invention, the position of the reference plane is set according to the focal depth of the objective optical system. Specifically, when the focal depth is set such that the distance from the first surface of the wall part on the side of the imaging object to the focal point of the objective optical system is smaller than the predetermined threshold value smaller than the thickness of the wall part, the optical path length of the reference light is set to the value equal to the optical length of the illumination light to the first surface. This is equivalent to such setting of the optical path length of the reference light or the position of the reference plane that a distance from a second surface of the wall part on a side opposite to the imaging object to the reference plane, which is a virtual plane perpendicular to an optical path of the illumination light, the optical path length of the illumination light to the virtual plane being equal to the optical path length of the reference light, and the thickness of the wall part are equal. If the optical path length of the reference light is set in this way, a conjugate image of the first surface appears at the same position as a real image of the first surface in the tomographic image. On the other hand, a conjugate image of the second surface appears at a position distant from the first surface by the thickness of the wall part in the tomographic image.

Accordingly, no conjugate image due to the container wall surface appears in a range where the distance from the first surface is smaller than the thickness of the wall part in a depth direction of the tomographic image in the container. A distance from a focus position of the objective optical system to the first surface is smaller than the thickness of the wall part. Thus, the focus position is included in the range where there is no complex conjugate image due to the container wall surface. That is, near a focal plane, tomographic information of the imaging object can be obtained without being affected by complex conjugate noise due to the container wall surface.

A thickness of the wall part can be grasped in advance from the shape of the container used. Further, the spatial positions of the first and second surfaces during imaging can also be estimated. Thus, the optical path length of the reference light can be set in conjunction with the setting of the focal depth such that the appearing positions of the complex conjugate images of the first and second surfaces satisfy the above condition. Since the reference plane needs not be largely distanced from the focal plane, image quality can also be improved.

Advantageous Effects of Invention

As described above, according to the invention, the influence of the complex conjugate noise due to the container wall surface can be eliminated near the position corresponding to the focal depth of the objective optical system. The above effect can be obtained if there is a function of setting the optical path length of the reference light in conjunction with the setting of the focal depth of the objective optical system. Therefore, a tomographic image having the influence of the complex conjugate noise eliminated therefrom can be obtained by a simple apparatus configuration.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EMBODIMENTS

Figure 1:
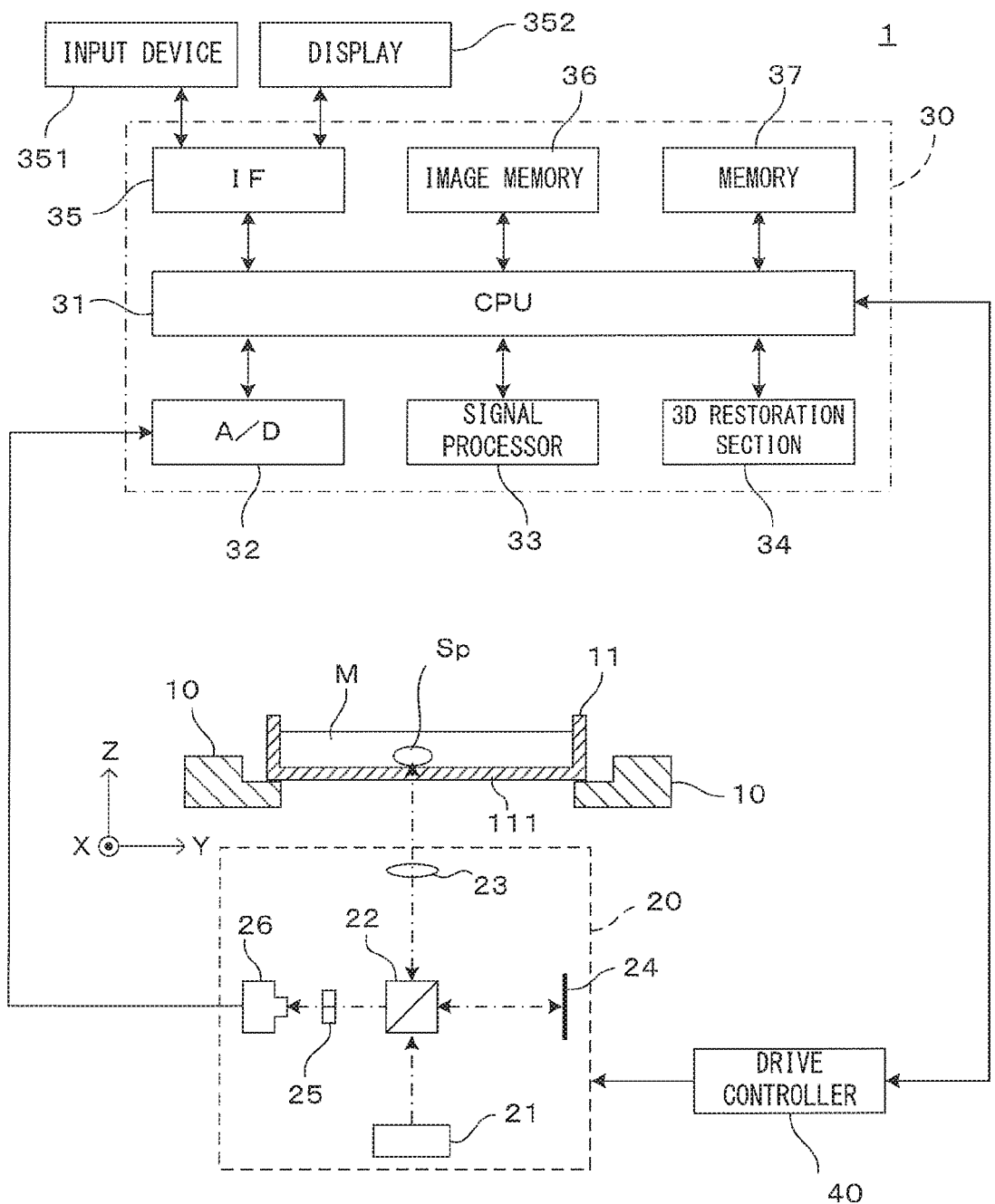
FIG. 1 is a drawing showing a configuration example of an image processing apparatus on which the present invention is applied.

FIG. 1 is a drawing showing a configuration example of an image processing apparatus on which the present invention is applied. The image processing apparatus 1 tomographically images a spheroid (cell aggregate) cultured in culture medium as an imaging object, processes the obtained image and generates a stereoscopic image of the spheroid. Note that although an example of imaging a spheroid as the imaging object is illustrated here, the imaging object is not limited to this. For unified presentation of the directions in drawings, the XYZ orthogonal coordinate axes are established as shown in FIG. 1. The XY plane is a horizontal surface. The Z axis represents the vertical axis, in more detail, the (−Z) direction represents the vertically downward direction.

The image processing apparatus 1 comprises a holder 10. The holder 10 holds in an approximately horizontal posture a container 11 in such a manner that its opening is directed toward above. The container 11 has a flat bottom surface made of transparent and uniform glass or resin and is called a "dish". A predetermined amount of an appropriate culture medium M is poured in the container 11 in advance, and a spheroid Sp is cultured in the medium at the bottom part 111 of the container 11. Although FIG. 1 shows only one spheroid Sp, a plurality of spheroids Sp may be cultured in one container 11.

An imaging unit 20 is disposed below the container 11 which is held by the holder 10. An optical coherence tomography (OCT) apparatus capable of imaging tomographic images of an imaging object in a non-contact non-destructive (non-invasive) manner is used as the imaging unit 20. The imaging unit 20 which is an OCT apparatus comprises a light source 21 which emits illumination light for an imaging object, a beam splitter 22, an objective optical system 23, a reference mirror 24, a spectroscope 25 and a photo-detector 26.

Further, the image processing apparatus 1 comprises a control unit 30 which controls operations of the apparatus and a drive controller 40 which controls movement of movable parts of the imaging unit 20. The control unit 30 comprises a CPU (Central Processing Unit) 31, an A/D convertor 32, a signal processor 33, a 3D restoration section 34, an interface (IF) section 35, an image memory 36 and a memory 37.

The CPU 31 governs operations of the entire apparatus by executing a predetermined control program. The control program executed by the CPU 31 and data which are generated during processing are saved in the memory 37. The A/D convertor 32 converts a signal which the photo-detector 26 of the imaging unit 20 outputs in accordance with the amount of received light into digital image data. The signal processor 33 performs image processing described later based upon a digital data outputted from the A/D converter 32, thereby generates a tomographic image of the imaging object. Based upon image data of a plurality of tomographic images, the 3D restoration section 34 generates a stereoscopic image (3D image) of the imaged cell aggregate. The image memory 36 saves the image data of the tomographic images generated by the signal processor 33 and the image data of the stereoscopic image generated by the 3D restoration section 34.

The interface section 35 realizes communication between the image processing apparatus 1 and outside. More specifically, the interface section 35 has a function of communicating with external equipment, and a user interface function of accepting manipulation by a user and informing the user of various types of information. For this purpose, an input device 351 and a display section 352 are connected to the interface section 35. The input device 351 is for instance a key board, a mouse, a touch panel or the like which can accept manipulation and entry concerning selection of the functions of the apparatus, setting of operating conditions, etc. The display section 352 comprises a liquid crystal display for example which shows various types of processing results such as the tomographic images imaged by the imaging unit 20 and the stereoscopic image generated by the 3D restoration section 34.

Further, the drive controller 40 makes the imaging unit 20 scan and move in accordance with a control command given from the CPU 31. As described next, the tomographic images of the spheroid (cell aggregate) which is the imaging object are obtained owing to combination of scan moving of the imaging unit 20 executed by the drive controller 40 and detection of the amount of the received light by the photo-detector 26.

Figure 2A:
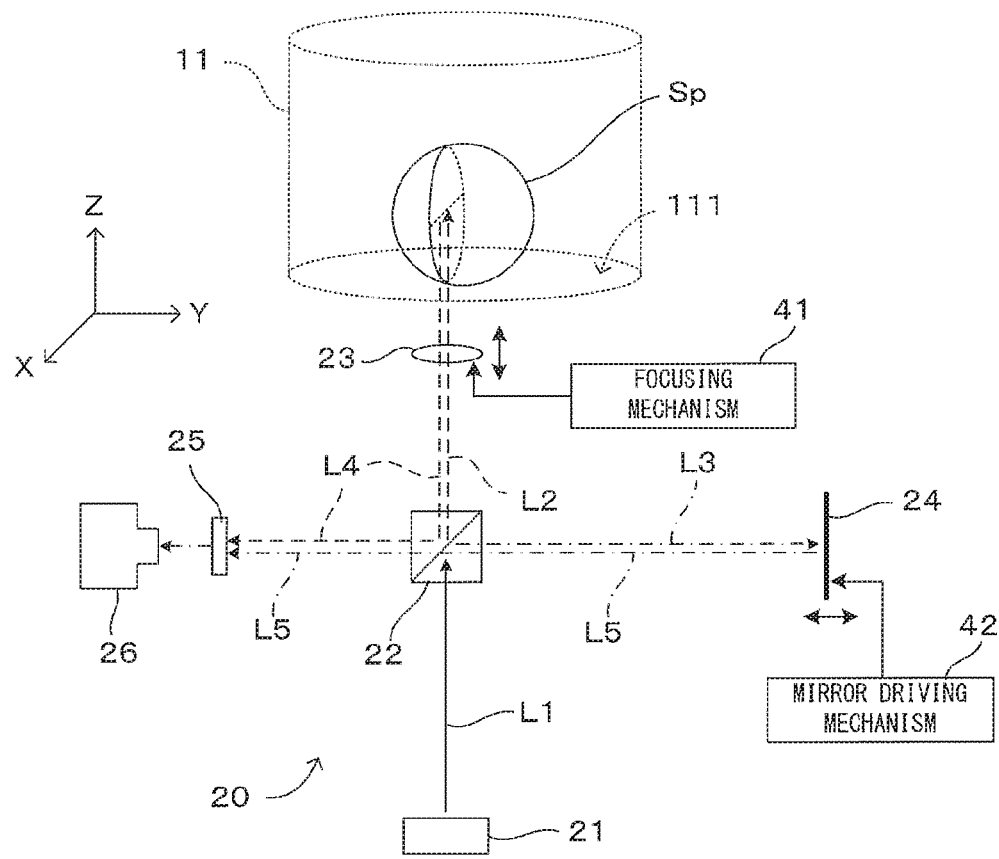
FIG. 2A is a drawing for describing the principle of imaging in this image processing apparatus.
Figure 2B:
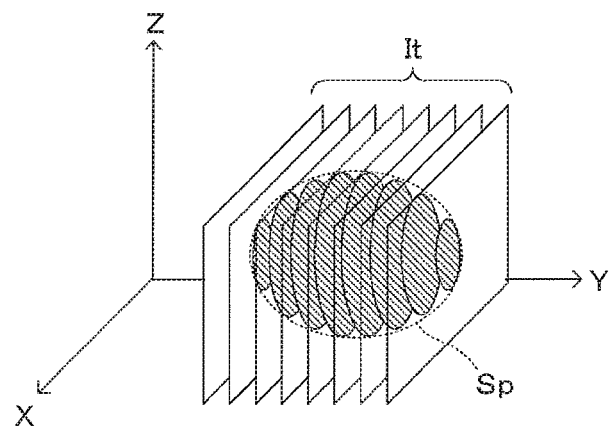
FIG. 2B is a drawing for describing the principle of imaging in this image processing apparatus.

FIGS. 2A and 2B are drawings for describing the principle of imaging in this image processing apparatus. More specifically, FIG. 2A is a drawing which shows optical paths inside the imaging unit 20, and FIG. 2B is a schematic drawing which shows tomographic imaging of a spheroid. As described earlier, the imaging unit 20 works as an optical coherence tomography (OCT) apparatus.

In the imaging unit 20, from the light source 21 which includes a light emitting element such as a light emitting diode or a super luminescent diode (SLD) for instance, a low-coherence light beam L1 containing a wide-range wavelength components is emitted. The light beam L1 impinges upon the beam splitter 22, and some light L2 indicated by the broken-line arrow propagates toward the well W, and some light L3 indicated by the arrow of long dashed short dashed line propagates toward the reference mirror 24.

The light L2 propagating toward the well W is incident on the container 11 by way of the objective optical system 23. More specifically, the light L2 emitted from the beam splitter 22 is incident on the bottom part 111 of the container 11 via the objective optical system 23. The objective optical system 23 has a function of converging the light L2 propagating from the beam splitter 22 toward the container 11 to the imaging object in the container 11 (spheroid Sp in this case) and a function of collecting the reflected light emitted from the imaging object and causing it to propagate toward the beam splitter 22. Although the objective optical system 23 is illustrated as a single objective lens in FIG. 2A, the objective optical system 23 may include a plurality of optical elements.

The objective optical system 23 is movable in the Z direction by a focusing mechanism 41 which is disposed to the drive controller 40. This enables the focus position of the objective optical system 23 with respect to the imaging object to be changed in the Z direction. Hereinafter, a focal position of the objective optical system in the depth direction (Z-direction) is referred to as a "focal depth". An optical axis of the objective optical system 23 is parallel to a vertical direction and, therefore, perpendicular to the bottom part 111 of the container 11 in the form of a flat surface. Further, an incident direction of illumination light on the objective optical system 23 is parallel to the optical axis, and the arrangement of the objective optical system 23 is determined such that a light center of the light coincides with the optical axis.

The incident light L2 via the bottom part 111 is reflected at the surface of the spheroid Sp unless the spheroid Sp transmits the light beam L2. On the other hand, when the spheroid Sp has a property of transmitting the light beam L2 to a certain extent, the light beam L2 propagates into inside the spheroid Sp and is reflected by a structure element which is inside the spheroid. When the near infrared rays for instance are used as the light beam L2, it is possible to allow the incident light to reach even inside the spheroid Sp. The reflected light from the spheroid Sp is irradiated as scattered light in various directions. Out of that, light L4 irradiated within a light collection range of the objective optical system 23 is collected by the objective optical system 23 and sent to the beam splitter 22.

The reference mirror 24 is supported movably by a mirror driving mechanism 42 provided in the drive controller 40. Thus, the reference mirror 24 is movable in a direction (Y direction in FIG. 2A) along the incident direction while a reflection surface thereof is perpendicular to an incident direction of the light L3. The light L3 incident on the reference mirror 24 is reflected by the reflection surface and propagates toward the beam splitter 22 as light L5 propagating in an opposite direction along an incident optical path. This light L5 becomes reference light. By changing the position of the reference mirror 24 by the mirror driving mechanism 42, an optical path length of the reference light changes.

The reflected light L4 reflected by a surface or an internal reflecting surface of the spheroid Sp and reference light L5 reflected by the reference mirror 24 are incident on the photo-detector 26 via the beam splitter 22. At this time, interference due to a phase difference between the reflected light L4 and the reference light L5 occurs, but an optical spectrum of interference light differs depending on a depth of the reflecting surface. That is, the optical spectrum of the interference light has information on a depth direction of the imaging object. Thus, a reflected light intensity distribution in the depth direction of the imaging object can be obtained by spectrally diffracting the interference light at each wavelength to detect a light quantity and Fourier transforming a detected interference signal. An OCT imaging technique based on such a principle is called Fourier domain OCT (FD-OCT).

The imaging unit 20 of this embodiment is provided with a spectroscope 25 on an optical path of the interference light from the beam splitter 22 to the photo-detector 26. A spectroscope utilizing a prism, a spectroscope utilizing a diffraction grating and the like can be, for example, used as the spectroscope 25. The interference light is spectrally diffracted for each wavelength component and received by the photo-detector 26.

By Fourier-transforming the interference signal output from the photo-detector 26 according to the interference light detected by the photo-detector 26, the reflected light intensity distribution of the spheroid Sp in the depth direction, i.e. in the Z direction at the incident position of the light beam L2 is obtained. By scanning the light beam L2 incident on the container 11 in the X direction, the reflected light intensity distribution in a plane parallel to an XZ plane is obtained, with the result that a tomographic image of the spheroid Sp having this plane as a cross-section can be generated. In this specification, a series of operations for obtaining one tomographic image It in a cross-section parallel to the XZ plane by beam scanning in the X direction is referred to as one imaging.

Images are obtained by changing the incident position of the light L2 along the Y direction over multiple steps and imaging a tomographic image for every change. As shown in FIG. 2B, a number of tomographic images It of the spheroid Sp are obtained along cross-sectional surfaces which are parallel to the XZ plane. As the scan pitch in the Y direction is reduced, it is possible to obtain image data with sufficient resolution to grasp the stereoscopic structure of the spheroid Sp. Scan movements of the light beam in X and Y direction are realized as an optical device (not shown) changing an optical path such as a Galvanometer mirror changes the incident position of the light beam to X and Y direction, the container 11 carrying the spheroid Sp and imaging unit 20 relatively move to X and Y direction or the like.

Note that, in the imaging unit 20 of the above description, it is the beam splitter 22 that has a function of dividing the light from the light source 21 to the illumination light and the reference light and a function of mixing the signal light and the reference light to cause interference. On the other hand, some of OCT imaging apparatuses are known to have a dividing/mixing function, for example, an optical fiber coupler as illustrated below.

Figure 3A:
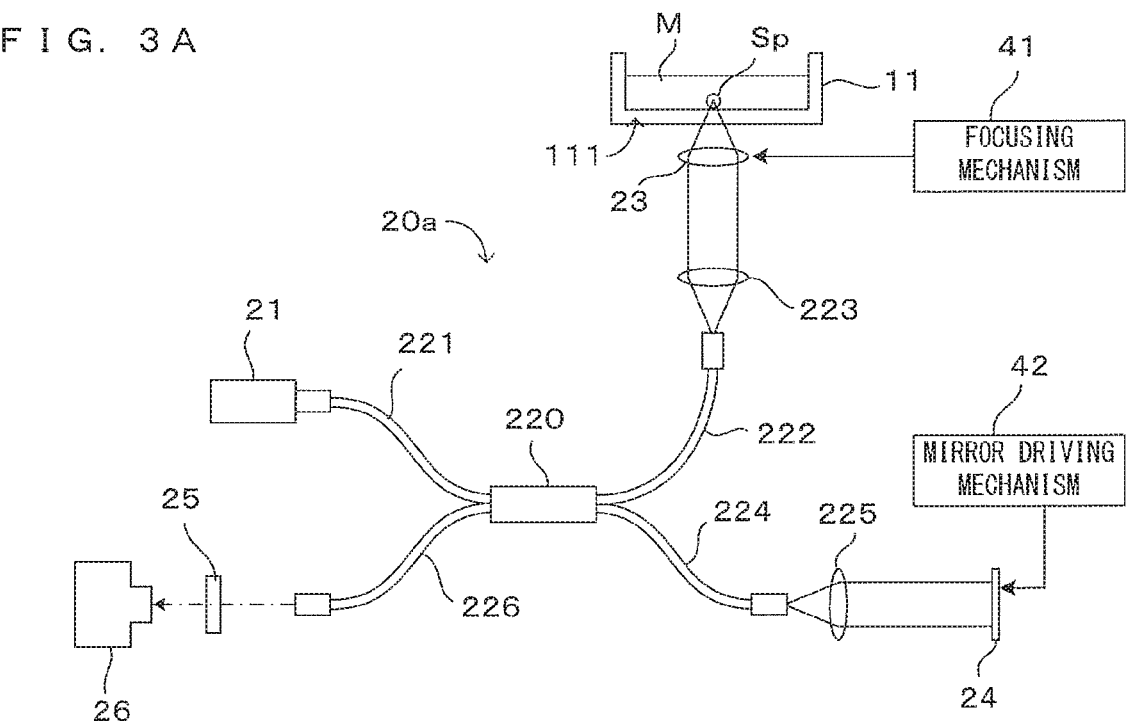
FIG. 3A is a diagram showing other configuration examples of the OCT apparatus.
Figure 3B:
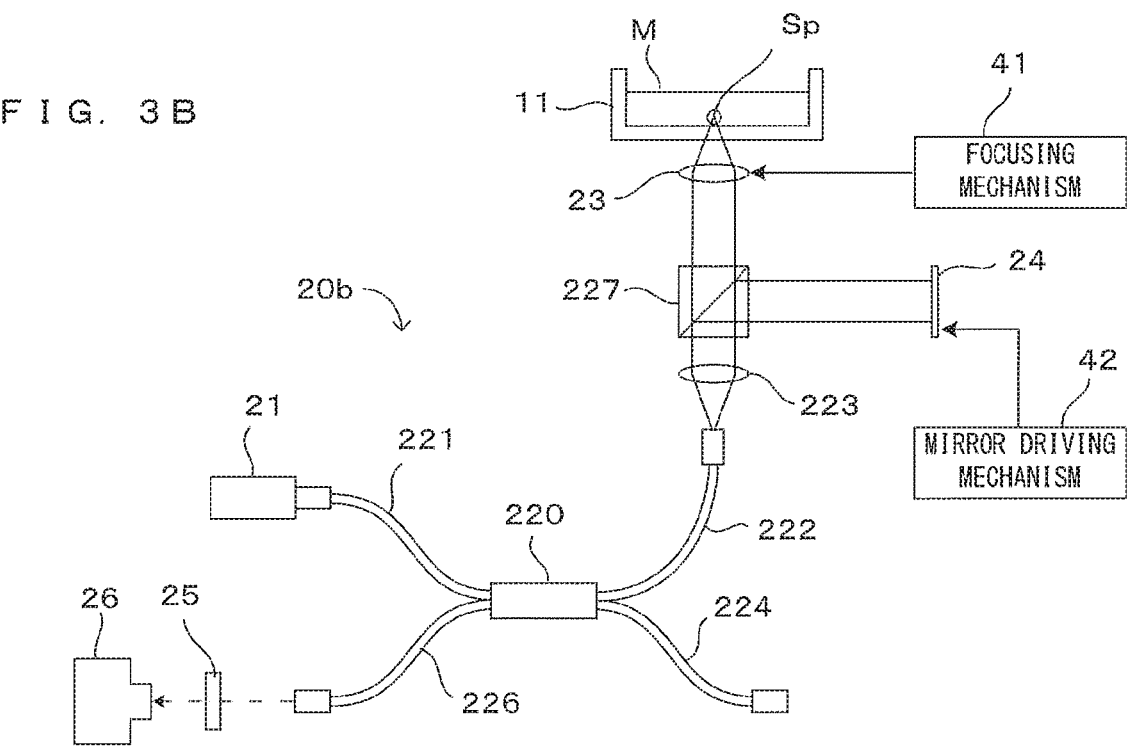
FIG. 3B is a diagram showing other configuration examples of the OCT apparatus.

FIGS. 3A and 3B are diagrams showing other configuration examples of the OCT apparatus. Note that, in the following description, constituent components same as or corresponding to those of other embodiments are denoted by the same reference signs to facilitate understanding. The structures and functions thereof are basically the same as those of the embodiment unless particularly described, and thereby the detail description is omitted. An OCT imaging principle for detecting interference light by the optical fiber coupler is not described in detail since it is known.

In an example shown in FIG. 3A, an imaging unit 20a includes an optical fiber coupler 220 instead of the beam splitter 22 as an optical device. One 221 of optical fibers constituting the optical fiber coupler 220 is connected to a light source 21 and low-coherence light emitted from the light source 21 is branched into lights to two optical fibers 222, 224 by the optical fiber coupler 220. The optical fiber 222 constitutes an object side optical path. More specifically, light emitted from an end part of the optical fiber 222 is incident on an objective optical system 23 via a collimator lens 223. Reflected light (signal light) from an imaging object is incident on the optical fiber 222 via the objective optical system 23 and the collimator lens 223.

Another optical fiber 224 constitutes a reference side optical path. More specifically, light emitted from an end part of the optical fiber 224 is incident on a reference mirror 24 via a collimator lens 225. Reflected light (reference light) from the reference mirror 24 is incident on the optical fiber 224 via the collimator lens 225. The signal light propagating in the optical fiber 222 and the reference light propagating in the optical fiber 224 interfere in the optical fiber coupler 220. The interference light is incident on a photo-detector 26 via an optical fiber 226 and a spectroscope 25. An intensity distribution of the reflected light on the imaging object is obtained from the interference light received from the photo-detector 26 as in the above embodiment.

Also in an example shown in FIG. 3B, an optical fiber coupler 220 is provided in an imaging unit 20b. However, an optical fiber 224 is not used and a collimator lens 223 and a beam splitter 227 as an optical device are provided on an optical path of light emitted from an optical fiber 222. As in the embodiment described above, an objective optical system 23 and a reference mirror 24 are arranged on two optical paths branched by the beam splitter 227. In such a configuration, signal light and reference light are mixed by the beam splitter 227 and interference light generated thereby is guided to a photo-detector 26 through the optical fibers 222, 226.

In these examples, the optical path of each light propagating in a space is partially replaced by an optical fiber in the principle diagram of FIG. 2A, but the operation principle is the same. Also in these examples, the focusing mechanism 41 moves the objective optical system 23 in directions toward and away from the container 11, whereby a focal depth of an objective optical system 23 with respect to the imaging object can be adjusted. Further, the mirror driving mechanism 42 moves the reference mirror 24 along the incident direction of the light, whereby the optical path length of the reference light can be changed.

An imaging operation by this image processing apparatus 1 is described below. The same imaging operation can be performed regardless of the configuration of the imaging unit using the beam splitter described above or that using an optical fiber coupler.

Figure 4:
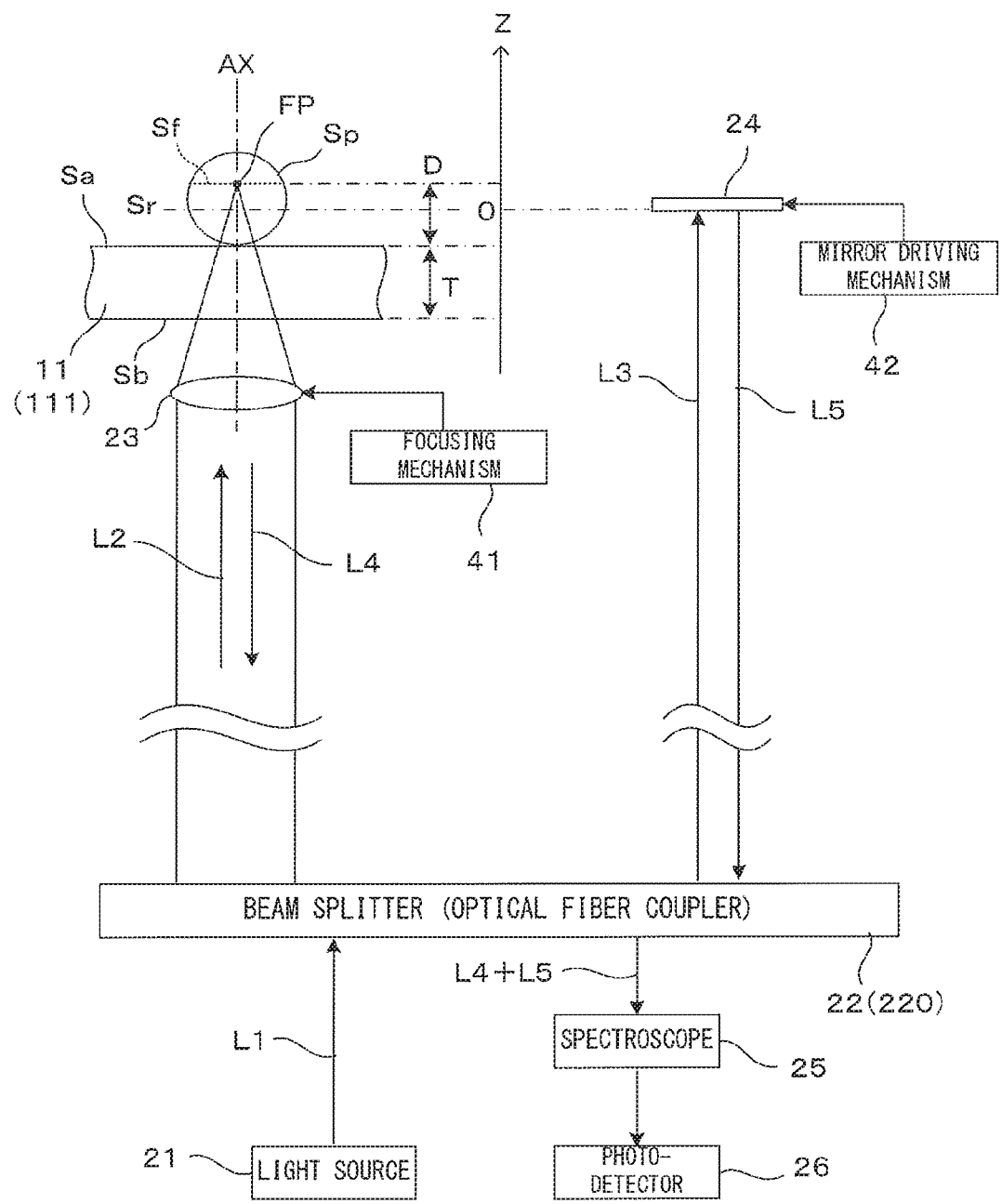
FIG. 4 is a diagram schematically showing a positional relationship between the focal depth of the objective optical system and the reference plane.
Figure 5A:
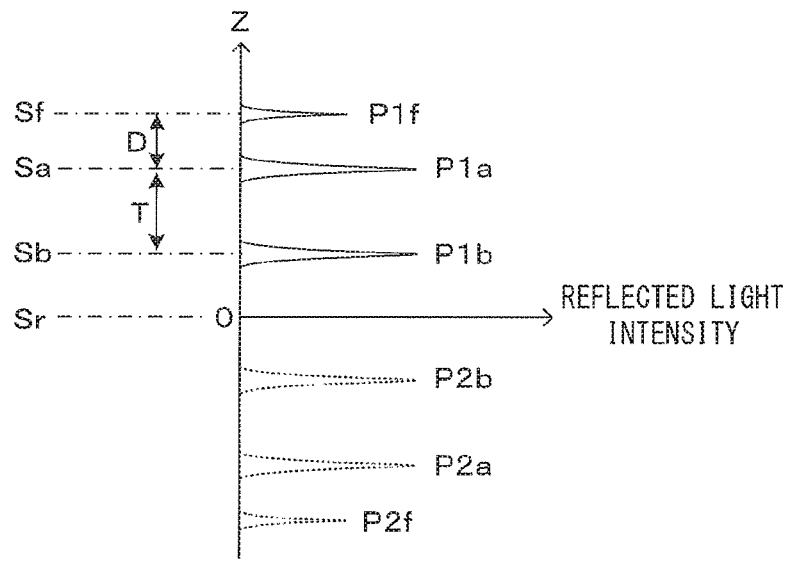
FIG. 5A is a drawing showing a relationship between the position of the reference plane and the reflected light intensity distribution.
Figure 5B:
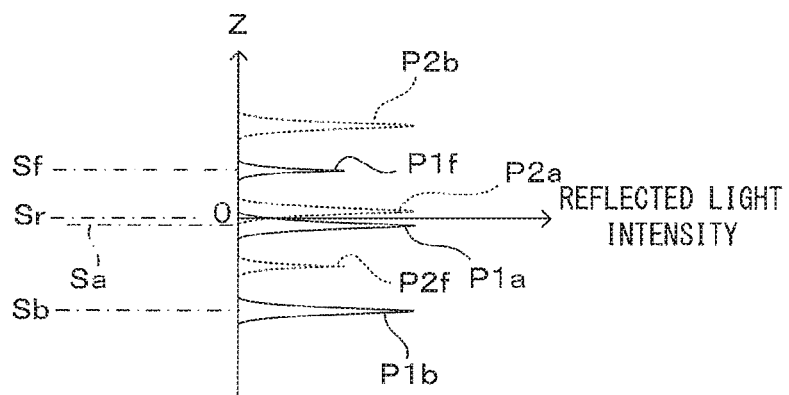
FIG. 5B is a drawing showing a relationship between the position of the reference plane and the reflected light intensity distribution.
Figure 5C:
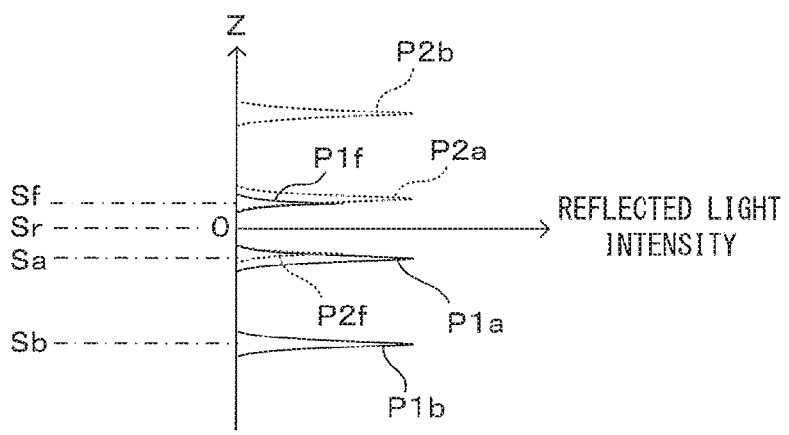
FIG. 5C is a drawing showing a relationship between the position of the reference plane and the reflected light intensity distribution.

FIG. 4 is a diagram schematically showing a positional relationship between the focal depth of the objective optical system and the reference plane. FIGS. 5A to 5C are drawings showing a relationship between the position of the reference plane and the reflected light intensity distribution. In the OCT imaging apparatus, a position where the optical path length of the signal light is equal to that of the reflected light serves, in principle, as a reference position of the image in the depth direction.

In the following description, in an objective optical path along which the illumination light L2 and the signal light L4 propagate via the objective optical system 23, a position corresponding to the reflection surface of the reference mirror 24 in a reference optical path is referred to as a reference plane Sr as shown in FIG. 4. Further, a surface of the bottom part 111 of the container 11 close to the spheroid Sp as an imaging object (i.e. inner bottom surface in contact with the culture medium) is referred to as an upper bottom surface Sa and an outer bottom surface of the bottom part 111 of the container 11 opposite to the upper bottom surface Sa is referred to as a lower bottom surface Sb. Furthermore, a focal plane of the objective optical system 23, i.e. a plane including an object-side focal point FP of the objective optical system 23 and perpendicular to an optical axis AX of the objective optical system 23, is denoted by reference sign Sf.

For later description, a distance between the upper bottom surface Sa and the lower bottom surface Sb, i.e. a thickness of the container bottom part 111 is denoted by reference sign T. Further, a distance between the upper bottom surface Sa and the focal plane Sf, i.e. a distance from the inner bottom surface of the container 11 to the focal point FP, is denoted by reference sign D. This distance D can be said to be a focal depth of the objective optical system 23 when the inner bottom surface (upper bottom surface Sa) of the container 11 is a starting point.

If a virtual reflected surface is present in the reference plane Sr in the objective optical path, an optical path length (from the light source 21 to the photo-detector 26) of light reflected by this reflection surface is equal to an optical path length (from the light source 21 to the photo-detector 26) of light reflected by the reflection surface of the reference mirror 24. The position of each reflection surface near the imaging object in the depth direction is expressed by a distance in the Z direction from the reference plane Sr.

When the imaging object (spheroid Sp) has a reflection surface in the focal plane Sf, a signal of a level corresponding to a reflected light intensity from this reflection surface appears at a depth position corresponding to a distance from the reference plane Sr to this reflection surface (i.e. focal plane Sf) in the reflected light intensity distribution after the Fourier transform. In the actual imaging object, signals corresponding to reflected lights from reflection surfaces at various depths appear at respective positions and those signals are superimposed in the reflected light intensity distribution. However, only the signal from the reflection surface in the focal plane Sf is thought here to facilitate understanding.

The flat surfaces Sa, Sb of the container bottom part 111 are also strong reflection surfaces and signals corresponding to these respectively appear at positions corresponding to distances from the reference plane Sr in the reflected light intensity distribution. For example, as shown in FIG. 5A, a signal P1$f$ corresponding to the focal plane Sf, a signal P1$a$ corresponding to the upper bottom surface Sa and a signal P1$b$ corresponding to the lower bottom surface Sb respectively appear at positions corresponding to distances from the reference plane Sr in the reflected light intensity distribution. Since these signals appear at different positions also in the reflected light intensity distribution if the respective reflection surface are separated in an actual space, these signals can be separated from each other if the resolution of the image processing apparatus 1 is sufficiently high.

On the other hand, in the reflected light intensity distribution obtained in the FD-OCT imaging technique, signals complex conjugate with the signals from the respective reflection surfaces appear, in principle, at positions symmetrical with the respective reflection surfaces with respect to the reference plane Sr. Specifically, a complex conjugate signal P2$f$ appears at a position conjugate with the signal P1$f$ corresponding to the focal plane Sf. Similarly, a complex conjugate signal P2$a$ appears at a position conjugate with the signal P1$a$ corresponding to the upper bottom surface Sa, and a complex conjugate signal P2$b$ appears at a position conjugate with the signal P1$b$ corresponding to the lower bottom surface Sb. Signals from reflection surfaces present in the actual space may be referred to as "actual signals" for distinction from the complex conjugate signals below.

As shown in FIG. 5A, when the reference plane Sr is located below the lower bottom surface Sb of the container 11, the complex conjugate signals P2f, P2a and P2b appear on a (−Z) side, which is a computational virtual space. Thus, these signals do not influence reflected light intensities from the reflection surfaces in the actual space detected on a (+Z) side. However, as shown in FIGS. 5B and 5C, complex conjugate signals of actual signals appearing on the (−Z) side may appear at conjugate positions on the (+Z) side depending on the setting of the reference plane Sr.

For example, in an example shown in FIG. 5B, the reference plane Sr is located between the focal plane Sf and the upper bottom surface Sa. Therefore, the complex conjugate signals P2a, P2b corresponding to the upper bottom surface Sa and the lower bottom surface Sb appear on the (+Z) side. Also in this case, the actual signal P1f corresponding to the focal plane Sf is separated from the other complex conjugate signals and, hence, can be detected. However, in an example shown in FIG. 5C in which the setting of the reference plane Sr is slightly different from that in the example of FIG. 5B, the actual signal P1f corresponding to the focal plane Sf and the complex conjugate signal P2a corresponding to the upper bottom surface Sa overlap in a (+Z) region and it is impossible to singly detect the signal P1f corresponding to the focal plane Sf.

As just described, even with the FD-OCT imaging technique, in principle, capable of imaging a range wide in a depth direction, it could be difficult to detect an actual signal from an imaging object due to the overlapping of a complex conjugate signal corresponding to a container bottom surface with the actual signal in imaging via a container bottom surface acting as a strong reflection surface. Particularly, when the bottom surface acts as a strong reflection surface, the complex conjugate signal corresponding to the bottom surface may shield the actual signal of the imaging object beyond a level of mere image noise. Thus, the influence of complex conjugate noise due to the container bottom surface is considerably larger than that of complex conjugate noise due to the imaging object itself.

Unlike the imaging object such as the spheroid Sp whose shape, size, internal structure and the like are indefinite, it is possible to grasp the shape and dimensions of the bottom surfaces of the container 11 for carrying the imaging object in advance. Specifically, the upper bottom surface Sa and the lower bottom surface Sb serve as strong reflection surfaces in the container bottom part 111 and no strong reflection surface is present between the both. Thus, the appearing complex conjugate signals are only due to the upper bottom surface Sa and the lower bottom surface Sb and no complex conjugate signal appears between those.

Further, if the upper bottom surface Sa and the lower bottom surface Sb are smooth surfaces, the complex conjugate signals P2a, P2b due to these appear as sharp peaks and the spreads thereof are small. When the reference plane Sr is set at a certain position, it is possible to estimate in advance at which positions in the reflected light intensity distribution peaks of the complex conjugate signals due to the upper bottom surface Sa and the lower bottom surface Sb appear. Further, although the positions of those peaks change according to the setting of the reference plane Sr, a distance between the both peaks is determined by a thickness T of the container bottom part 111 and invariable with respect to the setting of the reference plane Sr.

From these, it is expected that the influence of the container bottom surfaces is prevented from appearing for at least a partial region to be imaged by appropriately setting the reference plane Sr and managing the appearing positions of the complex conjugate signals. Specifically, as described next, the complex conjugate signals due to the container bottom surfaces may be set to appear at positions as distant as possible from the focal plane Sf of the objective optical system 23. By doing so, the reflected light intensity distribution unaffected by the complex conjugate noise can be obtained at least at the focal depth and in ranges near the focal depth.

Figure 6A:
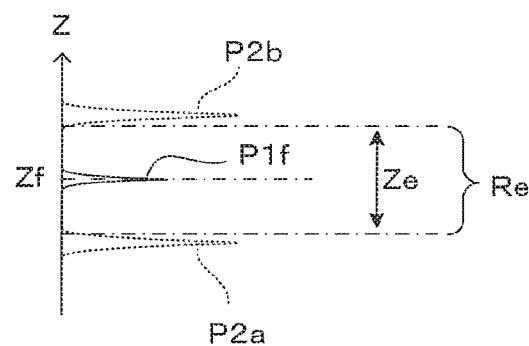
FIG. 6A is a drawing showing the principle of the image processing operation in this imaging apparatus.
Figure 6B:
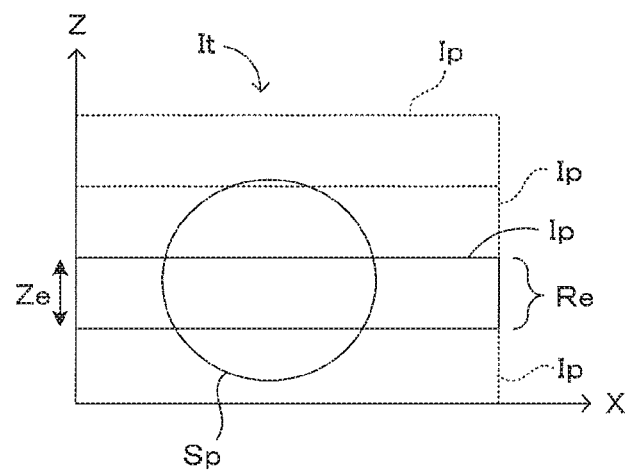
FIG. 6B is a drawing showing the principle of the image processing operation in this imaging apparatus.

FIGS. 6A and 6B are drawings showing the principle of the imaging operation in this image processing apparatus. More specifically, FIG. 6A is a drawing showing a positional relationship between the focus position in the image processing apparatus 1 and the complex conjugate signals due to the bottom surfaces, and FIG. 6B is a drawing schematically showing a method for constituting one tomographic image from a plurality of partial images. As shown in FIG. 6A, the actual signal P1f from the focal plane Sf appears at the position of a focal depth Zf of the objective optical system 23 in the reflected light intensity distribution in the depth direction (Z direction). The peak of the complex conjugate signal P2a corresponding to the upper bottom surface Sa of the container 11 and that of the complex conjugate signal P2b corresponding to the lower bottom surface Sb vary in position in the Z direction according to the setting of the reference plane Sr, but an inter-peak distance is invariable.

As shown in FIG. 6A, when the two peaks of the complex conjugate signals appear at opposite sides of a position corresponding to the focal depth Zf, there is no influence of the complex conjugate noise due to the container bottom surfaces inside a region Re between these peaks. This region Re is also a region which includes a position corresponding to the focal depth Zf and where best resolution is obtained in the depth direction. Thus, in a tomographic image obtained from the reflected light intensity distribution in this region Re, there is no influence of the complex conjugate noise due to the container bottom surfaces. In addition, since the tomographic image is detected in a focused state, image quality is also good. In this sense, this region Re is referred to as an "effective region" here and a length thereof in the Z direction is referred to as an "effective height" and denoted by reference sign Ze.

In FD-OCT imaging, a range wide in the depth direction can be, in principle, collectively imaged. However, as is clear from FIG. 6A, the tomographic image unaffected by the complex conjugate noise can be obtained only in the effective region Re between the two peaks P2a, P2b of the complex conjugate signals.

If the height of the range to be imaged in the Z direction is larger than the effective height Ze, a tomographic image It covering the entire range to be imaged can be generated by arranging and combining, in the Z direction, a plurality of partial images Ip imaged at imaging positions different in the Z direction as shown in FIG. 6B.

When the imaging object is the spheroid Sp, the height thereof is roughly about several μm to several hundreds of μm. On the other hand, the thickness T of the container bottom part 111 is generally several hundreds of μm to several mm. Thus, there are cases where the entire imaging object can be accommodated in the tomographic image obtained by one imaging and cases where it is not possible. If the entire imaging object cannot be accommodated in the tomographic image obtained by one imaging, imaging may be performed a plurality of number of times at imaging positions different in the Z direction as described above.

At this time, to improve image quality in each partial image Ip, it is desirable to change the focal depth Zf of the objective optical system 23 in accordance with the imaging range for the imaging of each partial image Ip. Here, it is further desirable to change the setting of the reference plane Sr in conjunction with the change of the focal depth Zf. This is for the following reason. To eliminate the influence of the complex conjugate noise due to the container bottom surfaces, it is desirable to also shift the position of the effective region Re in the Z direction according to a change of the focal depth Zf. To this end, the peak appearing positions of the complex conjugate signals need to be shifted in conjunction with the focus position.

In other words, by changing the position of the reference plane Sr in conjunction with the focal depth Zf during imaging, the partial images Ip in which the complex conjugate noise due to the container bottom surfaces is eliminated and which is imaged in the focused state can be obtained. By combining the plurality of partial images Ip having different focal depths Zf, the tomographic image It in which the influence of the complex conjugate noise due to the container bottom surfaces is eliminated in the entire image, focused at each depth and having excellent image quality can be obtained.

Next, a method for setting the reference plane matching the above condition is described. As described above, in the imaging operation of this image processing apparatus 1, the reference plane is set according to the setting of the focal depth of the objective optical system 23. The reference plane is set by setting the optical path length of the reference light.

Figure 7:
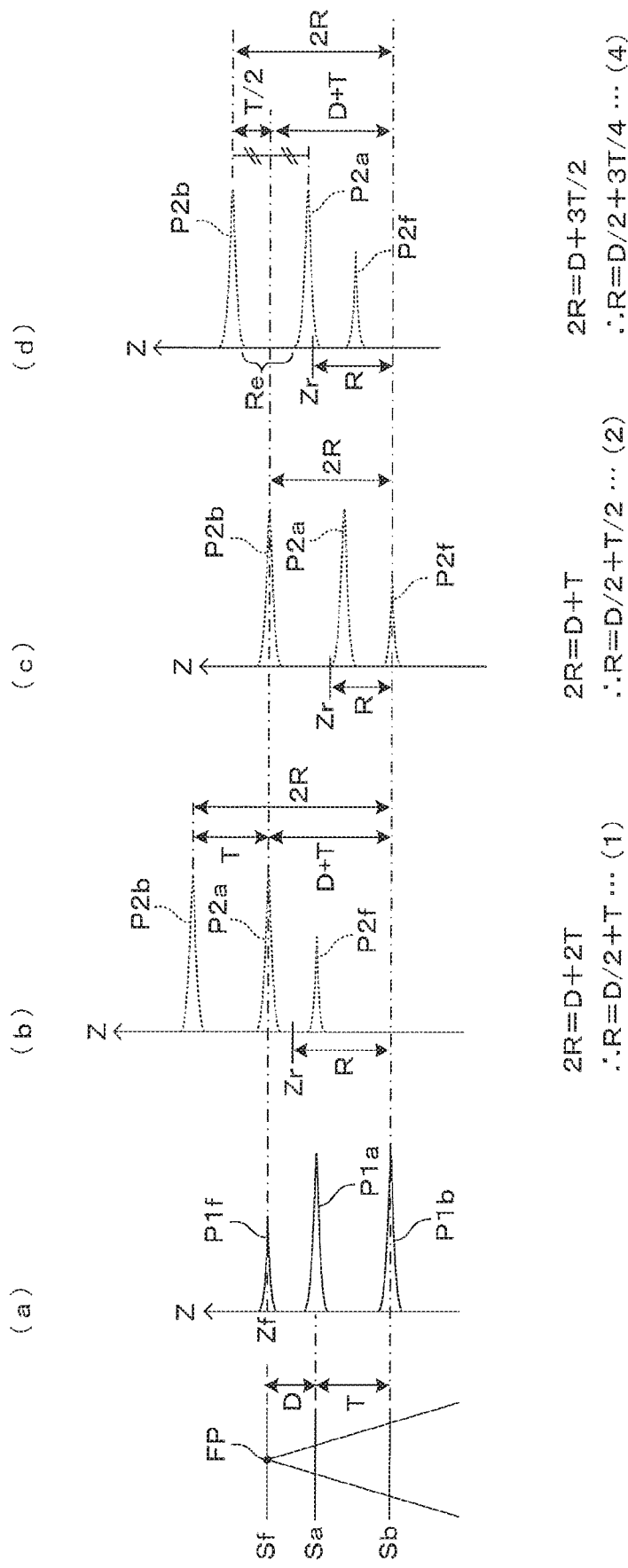
FIG. 7 is a drawing showing the principle of setting the reference plane corresponding to the focal depth.

FIG. 7 is a drawing showing the principle of setting the reference plane corresponding to the focal depth. As shown on the left end of FIG. 7, the distance between the upper bottom surface Sa and the lower bottom surface Sb of the container 11 is expressed as the thickness T of the container bottom part and the distance between the focal plane Sf including the focal point FP of the objective optical system 23 and the upper bottom surface Sa is expressed as the focal depth D.

As a case (a) shown in FIG. 7, in the reflected light intensity distribution after the Fourier transform, the actual signals P1f, P1a and P1b corresponding to the focal plane Sf, the upper bottom surface Sa and the lower bottom surface Sb appear at positions corresponding to the positions of the respective surfaces in the depth direction. In the reflected light intensity distribution obtained by actually performing the Fourier transform, the complex conjugate signals of the respective signals are superimposed. Here, it is tried to derive a condition under which the actual signal corresponding to the focal plane Sf is located between the peaks of the complex conjugate signals corresponding to the container bottom surfaces.

To obtain the condition under which the actual signal P1f corresponding to the focal plane Sf is located between the complex conjugate signals P2a, P2b due to the container bottom surfaces, a condition under which the actual signal P1f corresponding to the focal plane Sf overlaps with the complex conjugate signal P2a due to the upper bottom surface Sa as a case (b) shown in FIG. 7 and a condition under which the actual signal P1f corresponding to the focal plane Sf overlaps with the complex conjugate signal P2b due to the lower bottom surface Sb as a case (c) shown in FIG. 7 are considered.

First, the condition under which the actual signal P1f corresponding to the focal plane Sf overlaps with the complex conjugate signal P2a due to the upper bottom surface Sa as the case (b) shown in FIG. 7 is considered. Here, the position of the reference plane Sr in the Z direction is denoted by reference sign Zr and the distance from the lower bottom surface Sb of the container 11 to the reference plane Sr is denoted by reference sign R. Then, a relationship of the following equation is obtained from a positional relationship shown in FIG. 7 as the case (b):

$$R=D/2+T=(D+2T)/2 \qquad (1).$$

The value D is uniquely determined if the focal depth during imaging is determined. The value T is uniquely determined if the container 11 is determined.

On the other hand, the condition under which the actual signal P1f corresponding to the focal plane Sf overlaps with the complex conjugate signal P2b due to the lower bottom surface Sb as the case (c) shown in FIG. 7 is considered. At this time, a relationship of the following equation is obtained from a positional relationship shown in FIG. 7 as the case (c):

$$R=(D+T)/2 \qquad (2).$$

The condition under which the actual signal P1f corresponding to the focal plane Sf is located between the complex conjugate signals P2a, P2b due to the container bottom surfaces is that the value R is located between the value expressed by the above equation (1) and the value expressed by the above equation (2). Thus, a condition for this is expressed by the following inequality:

$$(D+T)/2<R<(D+2T)/2 \qquad (3).$$

Thus, it is understood that the position of the reference plane Sr may be set according to the focal depth such that the value R satisfies the relationship of the above inequality (3).

A condition under which the actual signal P1f appears at just a middle position between the two complex conjugate signals P2a, P2b as a case (d) shown in FIG. 7 is considered as a special example. From a positional relationship shown in FIG. 7 as the case (d), the position of the reference plane Sr may be set to satisfy the following equation:

$$R=D/2+3T/4 \qquad (4).$$

When such a condition is satisfied, the effective region Re has the same degree of spread in the (+Z) direction and (−Z) direction with the focal depth Zf as a center. If the objective optical system 23 has a focusing range (range in the depth of field) having the same degree of spread in the (+Z) direction and (−Z) direction with the focus position FP as a center, imaging can be performed with good image quality most effectively utilizing the focusing range of the objective optical system 23 by setting the position of the reference plane Sr to satisfy the condition of the above equation (4).

Note that the above consideration is satisfied when the spreads of the peaks P2a, P2b of the complex conjugate signals can be ignored. When the spreads of these peaks P2a, P2b are large, these peaks P2a, P2b may possibly indivisibly overlap with the actual signal P1f in regions close to upper and lower limits out of the range of the value R expressed by the above inequality (3). The condition in the case taking into account the spreads of the peaks can be obtained as follows.

Figure 8A:
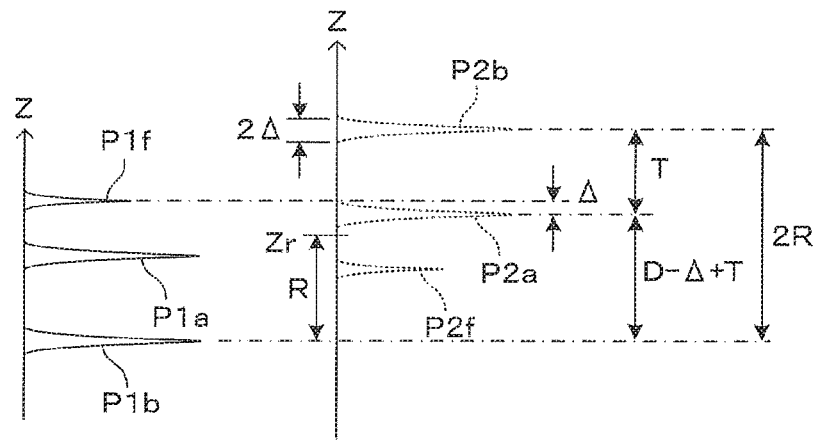
FIG. 8A is a drawing showing a concept when the peaks of the complex conjugate signals have certain spreads.
Figure 8B:
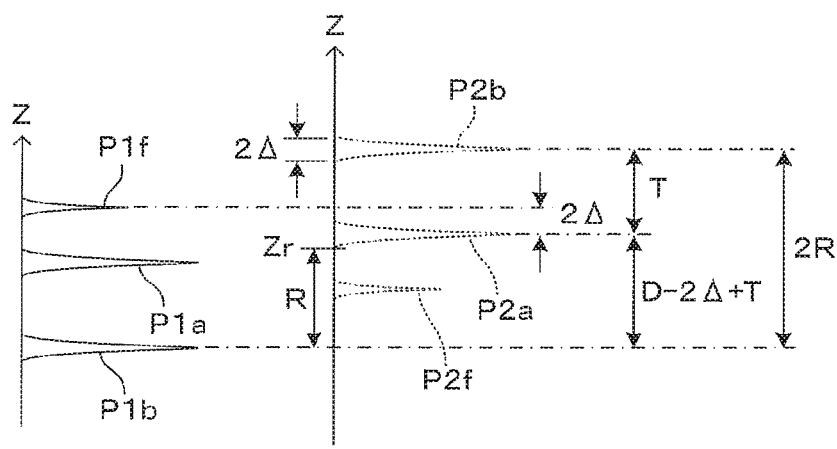
FIG. 8B is a drawing showing a concept when the peaks of the complex conjugate signals have certain spreads.

FIGS. 8A and 8B are drawings showing a concept when the peaks of the complex conjugate signals have certain spreads. As shown in FIG. 8A, the peaks P2a, P2b of the complex conjugate signals are respectively assumed to have a spread of about 2Δ. A value Δ can be, for example, specified by a half width at half maximum of a peak. FIG. 8A corresponds to a case where the influence of a peak width is added to the case (b) of FIG. 7. Specifically, FIG. 8A shows a condition under which the actual signal P1f does not strictly match the peak P2a of the complex conjugate signal and is shifted to a peak P1$a$ of another complex conjugate signal by about the half width at half maximum Δ of the peak P2$a$. In such a case, it is avoided that the actual signal P1$f$ is shielded by the peak P2$a$ of the complex conjugate signal.

At this time, the following equation is satisfied from a positional relationship shown in FIG. 8A:

$$R=(D-\Delta)/2+T=(D-\Delta+2T)/2 \quad (1a).$$

Although not shown, a relationship of the following equation is satisfied if a peak width is similarly added to the case (c) of FIG. 7:

$$R=(D+\Delta+T)/2 \quad (2a).$$

From these equations (1a) and (2a), a condition under which the actual signal P1$f$ is not shielded also when the peak widths of the complex conjugate signals are considered is expressed by the following inequality:

$$(D+\Delta+T)/2<R<(D-\Delta+2T)/2 \quad (3a).$$

A possible range of the value R becomes narrower than the range expressed by the inequality (3), but it is more reliably prevented that the actual signal P1$f$ is shielded by the spreads of the peaks of the complex conjugate signals.

Further, to make the actual signal P1$f$ and the complex conjugate signals P2$a$, P2$b$ more reliably separable, the actual signal P1$f$ may appear at a position shifted by about twice the half width at half maximum Δ of the peak P2$a$ of the complex conjugate signal as shown in FIG. 8B. A condition for this in the case (b) of FIG. 7 is expressed by the following equation:

$$R=(D-2\Delta)/2+T=(D-2\Delta+2T)/2=D/2-\Delta+T \quad (1b).$$

Similarly, the case (c) of FIG. 7 is expressed by the following equation:

$$R=(D+2\Delta+T)/2 \quad (2b).$$

From these, a possible preferable range of the value R is expressed by the following inequality:

$$(D+2\Delta+T)/2<R<(D-2\Delta+2T)/2 \quad (3b).$$

The above conditional inequalities (3), (3a) and (3b) can be used depending on to which degree the actual signal obtained from the imaging object and the complex conjugate signals due to the container bottom surfaces need to be separated. Specifically, the inequality (3) can be applied when the widths of the peaks of the complex conjugate signals can be substantially ignored. On the other hand, such as when the peaks of the complex conjugate signals have relatively large spreads or when the level of the actual signal is smaller than those of the complex conjugate signals, the inequality (3b) is preferably applied to more reliably eliminate the influence of the complex conjugate noise. The inequality (3a) may be applied in an intermediate case between those.

The extents of the spreads of the complex conjugate signals due to the container bottom surfaces depend on surface states of the container bottom surfaces. Specifically, if the upper bottom surface Sa and the lower bottom surface Sb of the container 11 are highly smooth surfaces, the peaks of the complex conjugate signals are sharp. As the surface roughness of the upper bottom surface Sa and the lower bottom surface Sb increases, the peak widths increase. Thus, the spreads of the complex conjugate signals can be estimated from the states of the container bottom surfaces.

Note that the above inequalities (3), (3a) and (3b) express a preferable range of the value R representing the position of the reference plane corresponding to the focal depth D and the container bottom part thickness T. However, it is not essential to give such a range for the value R in deriving the position of the reference plane according to the container bottom part thickness T and the focal depth D. Specifically, the value R may be uniquely determined using a function having the values D, T as variables, i.e. the following equation:

$$R=F(D,T) \quad (5).$$

In short, the function F(D, T) may be determined such that the value R given by the function F(D, T) shown in the equation (5) falls within the range expressed by any one of the conditional inequalities (3), (3a) and (3b) with respect to arbitrary values D, T.

In this embodiment, it is assumed that the position of the reference plane Sr is determined using the above equation (4) to effectively utilize the signals from the focusing range near the focus position of the objective optical system 23. Specifically, when the container bottom part thickness T and the focal depth D of the objective optical system 23 on the basis of the upper bottom surface Sa of the container are given, the position of the reference mirror 24 specifying the optical path length of the reference light is set such that the value R corresponding to the position of the reference plane on the basis of the lower bottom surface Sb of the container becomes a value expressed by the equation (4).

Figure 9:
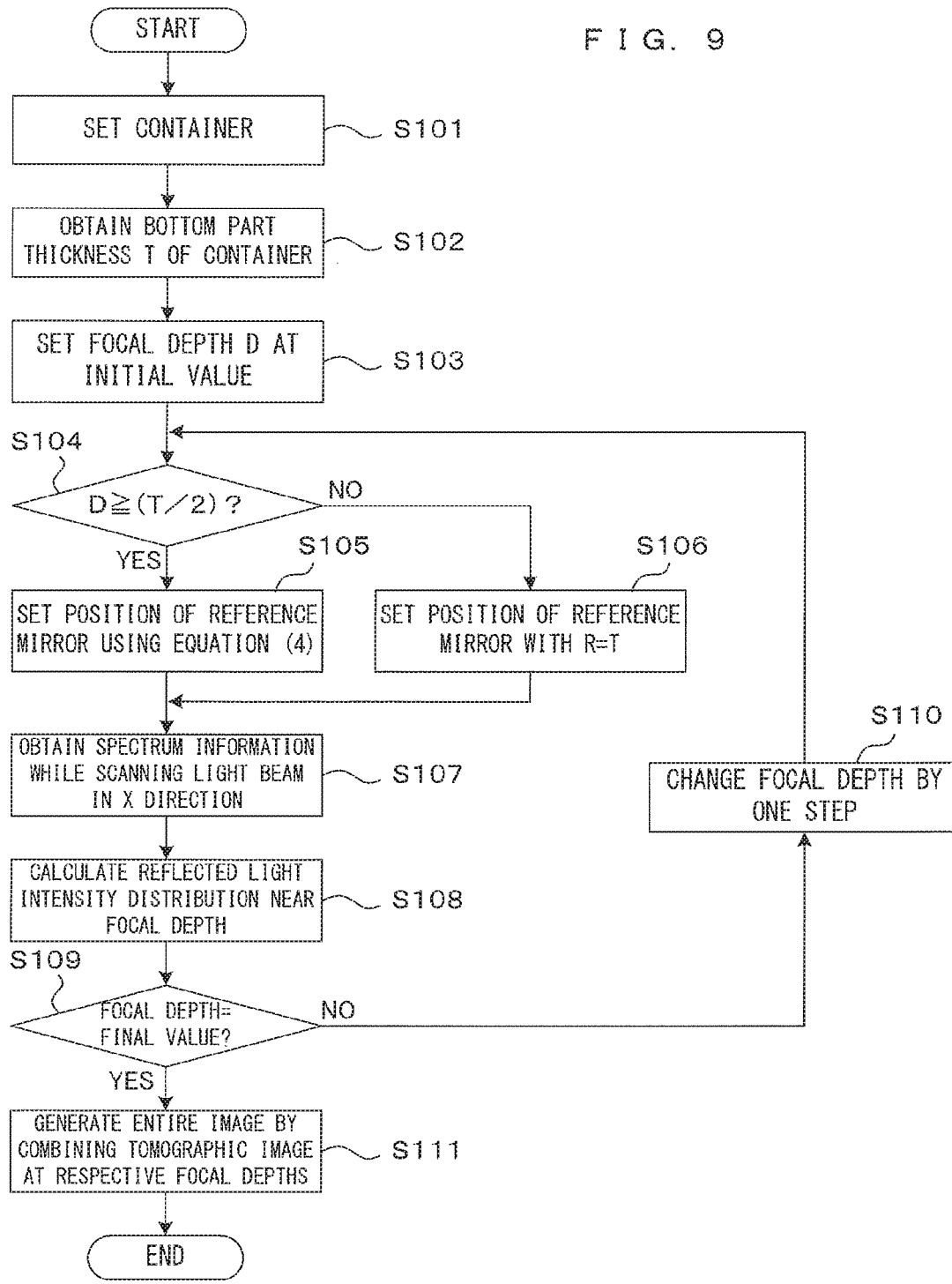
FIG. 9 is a flow chart showing the imaging operation in the image processing apparatus.

FIG. 9 is a flow chart showing the imaging operation in this image processing apparatus. When the container 11 carrying the spheroid Sp as an imaging object is set in the holder 10 (Step S101), the CPU 31 obtains information on the bottom part thickness T of this container 11 (Step S102). This information may be input using the input device 351 by a user or information corresponding to the used container 11 may be read from a database on containers registered in the memory 37 in advance. In this way, the CPU 31 obtains the information on the bottom part thickness T of the container 11.

The imaging object is imaged a plurality of number of times while the focal depth is changed and set in multiple stages. Specifically, at first, the focal depth D of the objective optical system 23 is set at a predetermined initial value by the focusing mechanism 41 (Step S103). Subsequently, the CPU 31 determines whether or not the set focal depth D is equal to or larger than half the container bottom part thickness T (Step S104).

If the focal depth D is equal to or larger than half the container bottom part thickness T (YES in Step S104), the CPU 31 derives the position of the reference mirror 24 using the equation (4) described above. According to this, the mirror driving mechanism 42 positions the reference mirror 24 at the obtained position (Step S105). On the other hand, if the focal depth D is smaller than half the container bottom part thickness T (NO in Step S104), the CPU 31 controls the mirror driving mechanism 42, as a special case, such that the value R corresponding to the position of the reference plane matches the bottom part thickness T of the container 11 and the position of the reference mirror 24 is set to satisfy this condition (Step S106). The reason for this is described later.

With the focal depth and the reference plane set in this way, low coherence light in a wide band is emitted from the light source 21 and interference light of signal light emitted from the imaging object and the reference light is detected. The interference light is spectrally diffracted by the spectroscope 25, an intensity of each wavelength component is detected by the photo-detector 26. An output signal of the photo-detector 26 is given as spectrum information to the CPU 31. The light irradiation to the imaging object and the detection of the interference light are performed a plurality of number of times while a light incident position is scanned in the X direction, and spectrum information of the reflected light is obtained each time (Step S107).

The signal processor 33 obtains a reflected light intensity distribution from a reflection surface present near the focal depth by Fourier-transforming the spectrum information given from the CPU 31 (Step S108). Note that this calculation may be performed after all imaging is finished. As described above, the reflected light intensity from the imaging object can be effectively obtained only in the effective region Re between the peaks of the complex conjugate signals corresponding to the container bottom surfaces. Regions outside the effective region Re may be excluded from a calculation target of the reflected light intensity distribution or these regions may be included in a processing target when the reflected light intensity distribution is calculated and, then, may be deleted when images are combined later.

Until the set value of the focal depth reaches a predetermined final value (Step S109), imaging is repeated while the focal depth is changed step by step (Step S110). A change step width of the focal depth may be determined in advance or may be set according to the bottom part thickness T of the container 11. To obtain a tomographic image focused in the entire image, the change step width is desirably equal to or smaller than the height Ze of the effective region Re.

Note that there is a possible case where the depth of field of the objective optical system 23 is smaller than the effective height Ze determined by an interval between the complex conjugate signals such as because the objective optical system 23 has a high magnification or a large numerical aperture. In this case, the above effective region Re may be maintained while allowing that an end part of the effective region Re is partially excluded from the focusing range of the objective optical system 23, or the effective region Re may be limited to a depth range determined by the depth of field of the objective optical system 23.

When imaging is finished (YES in Step s109), the signal processor 33 generates a tomographic image It of the imaging object in one cross-section parallel to the XZ plane by combining partial images Ip obtained at the respective focal depths (Step S111). If necessary, a plurality of tomographic images It at positions different in the Y direction can be obtained by repeating the above imaging operation while changing the position in the Y direction. The 3D restoration section 34 can generate a stereoscopic image of the imaging object from these tomographic images It.

Next, there is described the reason why the position of the reference mirror 24 is set with R=T (Step S106) if the set focal depth D is smaller than half the container bottom part thickness (T/2) (NO in Step S104). As described thus far, the position of the reference mirror 24 is set in accordance with the equation (4) to locate the focus position in the middle between the two complex conjugate signals due to the container bottom surfaces in order to effectively utilize the focusing range of the objective optical system 23. At this time, if the peak widths of the complex conjugate signals are ignored, the range of the effective region Re is (T/2) in each of the (+Z) direction and (−Z) direction from the focal depth as a center (see the case (d) of FIG. 7).

Figure 10:
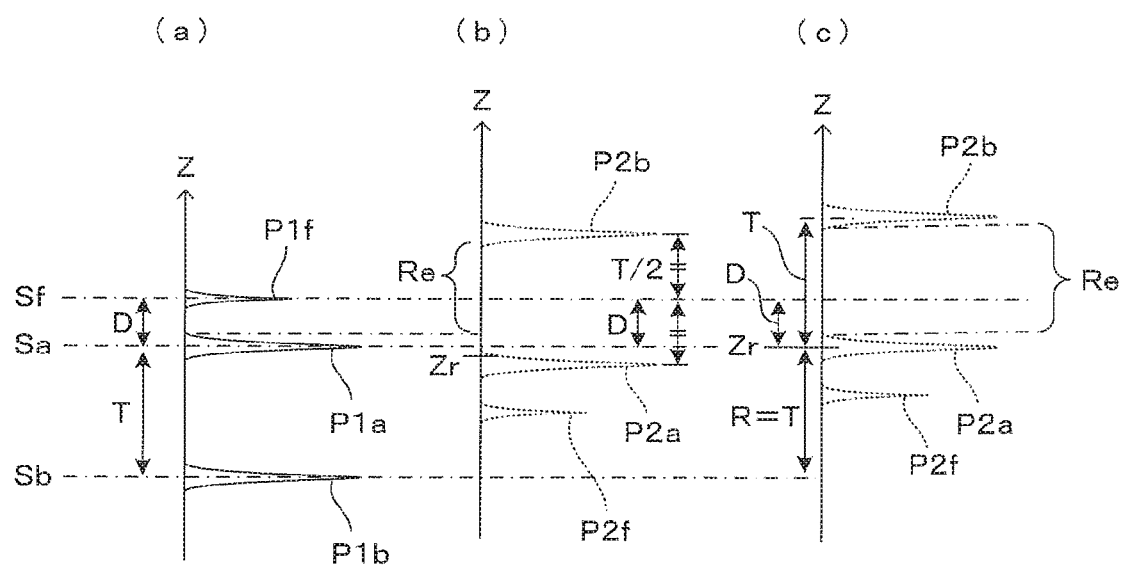
FIG. 10 is a drawing showing a reflected light peak position when the focal depth is below half the container bottom part thickness.

FIG. 10 is a drawing showing a reflected light peak position when the focal depth is below half the container bottom part thickness. A case (a) in FIG. 10 is considered where the focal plane Sf is close to the upper bottom surface Sa of the container 11 and the focal depth D is smaller than half the container bottom part thickness T. At this time, if the reference plane is set in accordance with the equation (4) so that the actual signal P1f is located in the middle between the two complex conjugate signals P2a, P2b, the two complex conjugate signals P2a, P2b appear at positions each distant from the position of the actual signal P1f by (T/2) as a case (b) shown in FIG. 10.

However, the actual signal P1a corresponding to the upper bottom surface Sa of the container 11 appears at a position distant from the actual signal P1f by the distance D. Since D<(T/2), the effective region Re at this time is limited to a region between the actual signal P1a corresponding to the upper bottom surface Sa of the container 11 and the complex conjugate signal P2b corresponding to the lower bottom surface Sb. That is, it is meaningless to set the position of the reference mirror 24 such that the actual signal P1f is located in the middle between the two complex conjugate signals P2a, P2b. Rather, this narrows the effective region Re.

Accordingly, as a case (c) shown in FIG. 10, the position of the reference mirror 24 is set such that the actual signal P1a corresponding to the upper bottom surface Sa of the container 11 and the complex conjugate signal P2a conjugate with this actual signal P1a overlap, i.e. R=T. The effective region Re in this case is a region between the actual signal P1a corresponding to the upper bottom surface Sa of the container 11 or the complex conjugate signal P2a conjugate with this actual signal P1a and appearing at the same position and the other complex conjugate signal P2b, and the effective region Re can be made wider than in the case (b) shown in FIG. 10.

To enable this, in the imaging operation of FIG. 9, the position of the reference mirror 24 is set such that R=T regardless of the equation (4) when a relationship of D<(T/2) is satisfied for the set focal depth D. This is equivalent to the matching of the reference plane Sr with the upper bottom surface Sa of the container 11. Further, it corresponds to a case D=0 in the equation (4).

In this way, imaging can be performed effectively utilizing the focusing range of the objective optical system 23. In a configuration for generating the tomographic image It by combining the plurality of partial images Ip, it is possible to reduce the number of the necessary partial images Ip and shorten a time required for the generation of an image by maximally utilizing the focusing range of the objective optical system 23. Also when imaging is performed at a plurality of focal depths at which the relationship of D<(T/2) is satisfied, the reference mirror 24 is fixed at the position where R=T regardless of the setting of the focal depth. Since a step of moving the reference mirror 24 can be omitted, a processing time can also be shortened.

Note that the effective region Re including no complex conjugate signal in the tomographic image is as follows when the position of the reference mirror 24 is set such that the reference plane Sr and the upper bottom surface Sa of the container 11 match. As shown in FIG. 10(c), a region between the complex conjugate signal P2a of the upper bottom surface Sa appearing at a position corresponding to the reference plane Sr (by being superimposed on the actual signal P1a) and the complex conjugate signal P2b of the lower bottom surface Sb appearing at a position distant from the complex conjugate signal P2a by a distance corresponding to the container bottom part thickness T is the effective region Re. Thus, in terms of preventing the real signal P1f appearing on the focal plane Sf from being affected by the complex conjugate noise, the focal plane Sf may be at any position as long as the focal plane Sf is included in the effective region Re determined by the set value R.

In other words, a method for setting the position of the reference mirror 24 such that the reference plane Sr and the upper bottom surface Sa of the container 11 match in this way effectively functions in general when the focal depth is set such that the distance D between the focal plane Sf and the upper bottom surface Sa of the container 11 is smaller than the bottom part thickness T. Thus, whether or not the position Zr of the reference mirror 24 is determined in accordance with the equation (4) or determined to set R=T can be judged on the basis of a comparison of the set value D of the focal depth and an appropriate threshold value smaller than the bottom part thickness T. Specifically, the reference mirror position may be determined in accordance with the equation (4) if the set focal depth D is larger than the threshold value determined in advance and determined to set R=T if the focal depth D is smaller than the threshold value.

Note that the threshold value can be, in principle, an arbitrary value within a numerical value range greater than 0 and smaller than T. However, the complex conjugate signals P2a, P2b have, in reality, a certain breadth in the depth direction. In view of this, the threshold value is preferably determined within a range obtained by excluding about half the breadth of the complex conjugate signals at each of upper and lower limits of the above range.

In this embodiment, in terms of including the focal plane Sf in the effective region Re and making the range of the effective region Re as wide as possible by suppressing the influence of the breadth of the complex conjugate signals, the judging step of Step S104 is configured as follows. The equation (4) is applied in the range of the focal depth D where the focal plane Sf can be located in a center of the effective region Re by the equation (4), i.e. D≥(T/2). On the other hand, if the focal depth D is smaller than this, the reference mirror position is determined with R=T set. This is equivalent to a case where the above threshold value is set at half the bottom part thickness (T/2).

As described above, the image processing apparatus 1 of this embodiment is the imaging apparatus utilizing the Fourier domain (FD) OCT imaging principle, and has a function of changing the focal depth of the objective optical system 23. When imaging is performed via the bottom part of the container 11, the optical path length of the reference light specifying the reference plane is set by adjusting the position of the reference mirror 24 according to the setting of the focal depth. A calculation equation for deriving the position of the reference plane is given as a function of the focal depth D and the thickness T of the bottom part of the container 11.

According to such a configuration, in the reflected light intensity distribution in the depth direction, the complex conjugate signals corresponding to the upper bottom surface Sa and the lower bottom surface Sb of the container 11 can appear across the position corresponding to the focal depth. Since the interval between the two complex conjugate signals is a fixed value determined by the thickness T of the bottom part of the container 11, imaging can be performed, as a result, with the influence of the complex conjugate noise eliminated at the focus position and in a range having a fixed width near the focus position.

However, if the focal depth is below half the container bottom part thickness, the optical path length of the reference light is set such that the reference plane is located at a position corresponding to the upper bottom surface Sa of the container 11 regardless of the setting of the focus position in that range. In this way, the complex conjugate signal due to the upper bottom surface Sa appears at a position corresponding to the upper bottom surface Sa, whereas the complex conjugate signal due to the lower bottom surface Sb appears at a position distant from the upper bottom surface Sa by the container bottom part thickness. As a result, the signal from the vicinity of the focus position appearing between these is prevented from being affected by the complex conjugate noise.

If necessary, a tomographic image including a range wider than the interval between the two complex conjugate signals in the depth direction can be generated by combining results obtained by imaging performed a plurality of number of times at focus positions different in the depth direction. At this time, the influence of the complex conjugate noise can be constantly eliminated near the focus position by changing the position of the reference mirror 24 as the focus position is changed. In addition, the image quality of the entire tomographic image can be improved by combining partial images in relatively narrow ranges imaged in the focused state to generate the tomographic image in a wider range.

As described above, the image processing apparatus 1 of this embodiment corresponds to an "imaging apparatus" of the invention with the spheroid Sp or the like as an "imaging object". The imaging unit 20, 20a, 20b functions as an "imaging unit" of the invention and, out of the control unit 30, the CPU 31 functions as a "controller" of the invention and the signal processor 33 functions as a "signal processor" of the invention.

Further, in the above embodiment, the bottom part 111 of the container 11 corresponds to a "wall part" of the invention, and the upper bottom surface Sa and the lower bottom surface Sb respectively correspond to a "first surface" and a "second surface" of the invention. Further, the value (T/2) corresponds to a "threshold value" of the invention.

Note that the invention is not limited to the above embodiment and various changes other than those described above can be made without departing from the gist of the invention. For example, in the process of deriving the position of the reference plane Sr in the above embodiment, the focal depth of the objective optical system 23 is expressed by the value D starting from the upper bottom surface Sa of the container 11 and the position of the reference plane Sr is expressed by the value R starting from the lower bottom surface Sb of the container 11. However, based on which position each position is expressed is arbitrary, and a process substantially equivalent to the above technical concept can be realized by appropriately modifying each equation according to the arbitrarily the selected reference position.

Further, for example, the imaging object of the above embodiment is the spheroid Sp carried in the container called a dish in the form of a shallow plate. However, the types of the imaging object and the container for carrying the imaging object are not limited to these. For example, cells and the like cultured in a well plate in which a plurality of wells capable of carrying specimens are provided on one plate may be imaging objects.

Further, for example, the image processing apparatus 1 of the above embodiment images the imaging object in the container via the bottom part 111 of the container 11. However, an imaging direction is not limited to this. For example, the present invention can be suitably applied also in the case of performing imaging via a side wall surface of the container storing the imaging object.

Further, for example, how to obtain the value R is changed depending on whether the focal depth D is larger or smaller than half the container bottom part thickness T in the above embodiment. However, it is effective to obtain the value R in accordance with the equation (4) also when the focal depth D is smaller than half the container bottom part thickness T. For example, in a situation where the narrowing of the range of the effective region Re is allowable, the equation (4) may be uniformly applied in the entire variable range of the focal depth D.

Further, for example, the equation (4) is employed such that the focus position is located in the center of the region between the peaks of the two complex conjugate signals due to the container bottom surfaces in the above embodiment. However, the focus position needs not always be located just in the middle between the two peaks. For example, if the depth of field of the objective optical system is larger than the interval between the two peaks, the entire region between the both peaks can be included in the focusing range even if the focus position is deviated from the center between the both peaks, and the quality of the obtained image is not different from that of the above embodiment. A positional relationship between such a focus position and the peaks of the complex conjugate signals can be realized, using an equation obtained by adding an appropriate offset to the equation (4) or an alternative equation obtained similarly to the equation (4) by appropriately modifying the value "T/2" in the case (d) of FIG. 7.

Further, for example, the tomographic image It is obtained by combining the partial images Ip imaged with the focal depth set in multiple stages in the above embodiment. However, for example, if the container bottom part thickness and the depth of field of the objective optical system are sufficiently larger than the height of the imaging object, the entire image of the imaging object can be obtained by one imaging. Also in this case, the influence of the complex conjugate noise due to the container bottom surfaces on the imaging result can be effectively prevented by setting the optical path length of the reference light to satisfy the above condition according to the setting of the focus position.

Further, although the resolution of the objective optical system is not particularly limited in the invention, the invention is particularly effective when imaging at a high magnification or with a high resolution is required. The reason for that is as follows. Since a depth of field of an objective optical system becomes shallower when a high magnification or a high resolution is required, the range of an image in a depth direction obtained by one imaging is limited even with an FD-OCT apparatus capable of imaging in a range wide in the depth direction. Thus, it may be necessary to perform imaging a plurality of number of times for a reason not directly related to the technical concept of the invention. By applying the invention in such a case, the image obtained by one imaging is not influenced by complex conjugate noise and can be entirely in a focused state. Thus, imaging can be performed with good image quality.

Further, a general-purpose processing apparatus having a general configuration such as a personal computer or work station can be used as the control unit 30 of the above embodiment. Specifically, the image processing apparatus 1 may be configured by combining the imaging apparatus including the imaging unit 20 and the drive controller 40 and having a minimum control function for operating these and a personal computer or the like functioning as the control unit 30 by executing a control program describing the above processing contents.

As the specific embodiment has been illustrated and described above, a region between an image of a first surface and a conjugate image of a second surface of a tomographic image obtained from a reflected light intensity distribution obtained in one imaging may be set as an effective image region. According to such a configuration, an image region including no noise due to the conjugate images of the first and second surfaces can be extracted as an effective one.

Further, interference light may be detected a plurality of number of times at mutually different focal depths with respect to the same imaging object, an optical path length of reference light may be set every time the focal depth is set, and a reflected light intensity distribution near each focal point may be obtained from a plurality of obtained detection results. According to the principle of the invention, a depth range where the reflected light intensity distribution having complex conjugate noise eliminated is obtained in one imaging is limited by the thickness of the container wall part. If the plurality of detection results obtained at mutually different focal depths are superimposed, a tomographic image including a range beyond the thickness of the container wall part and having a good image quality can be obtained.

Further, when the focal depth is set such that the distance from the first surface to the focal point of the objective optical system is larger than the threshold value, the optical path length of the reference light may be set to satisfy a relationship:

$$(D+T)/2 < R < (D+2T)/2,$$

where T denotes the thickness of the wall part, D denotes the distance from the first surface to the focal point of the objective optical system and R denotes the distance from the second surface to the reference plane, which is a virtual plane perpendicular to the optical path of the illumination light, the optical path length of the illumination light to the virtual plane being equal to the optical path length of the reference light. If the reference plane is set such that the value R satisfies such a condition, the appearing positions of the conjugate images of the first and second surfaces can be reliably set to the positions across the focal point of the objective optical system. Thus, the influence of the complex conjugate noise near the focal point can be eliminated. By setting the reference plane according to the relationship of the depth of the focal point and the thickness of the wall part in this way, the influence of the complex conjugate noise due to the wall part can be eliminated at an arbitrary focal depth.

Further, the imaging apparatus according to this invention may include the reference mirror arranged in the optical path of the reference light to specify the optical path length of the reference light, and the controller may include a mirror driving mechanism for adjusting the optical path length of the reference light by changing the position of the reference mirror and a focusing mechanism for adjusting the focal depth by driving the objective optical system. Such a configuration enables the optical path length of the reference light to be changed and set by changing the position of the reference mirror according to the focal depth of the objective optical system and is preferable in carrying out the invention.

Further, the imaging method according to this invention may include a step of obtaining information on the thickness of the wall part before the optical path length of the reference light is set. According to such a configuration, the optical path length of the reference light is easily adjusted to match the above condition based on the information on the set value of the focal depth and the thickness of the wall part.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

INDUSTRIAL APPLICABILITY

This invention can be applied to FD-OCT imaging techniques in general. Particularly, this invention can be suitably applied in the fields of medicine, biochemistry and drug discovery to image cells and cell clusters cultured in a container such as a dish.

REFERENCE SIGN LIST 1 image processing apparatus
11 container
20, 20a, 20b imaging unit (imaging unit)
22 beam splitter
23 objective optical system
24 reference mirror
30 control unit
31 CPU (controller)
33 signal processor
40 drive controller
41 focusing mechanism
42 mirror driving mechanism
111 bottom part (of the container 11) (wall part)
220 optical fiber coupler
Sa upper surface (of the container 11) (first surface)
Sb bottom surface (of the container 11) (second surface
Sf focal plane
Sp spheroid
Sr reference plane

The invention claimed is:

1. An imaging apparatus for tomographically imaging an imaging object stored in a container having an optically transparent wall part, the imaging apparatus comprising:
an imaging unit which causes one branch light branched from low coherence light in a wide band emitted from a light source to be incident as illumination light on the imaging object via the wall part, detects interference light generated by interference of signal light obtained by condensing reflected light from the imaging object emitted via the wall part by an objective optical system and reference light generated from another branch light and outputs an interference signal corresponding to the detected interference light;
a signal processor which obtains reflected light intensity distribution of the imaging object in an incident direction of the illumination light by Fourier-transforming a spectrum of the interference light based on the interference signal and generates a tomographic image from the reflected light intensity distribution; and
a controller which changes and sets a focal depth in the incident direction of the objective optical system on the imaging object and an optical path length of the reference light, wherein
when the focal depth is set such that a distance from a first surface of the wall part on the side of the imaging object to a focal point of the objective optical system is smaller than a predetermined threshold value smaller than a thickness of the wall part, the controller sets the optical path length of the reference light to a value equal to an optical path length of the illumination light to the first surface.

2. The imaging apparatus according to claim 1, wherein the controller sets the optical path length of the reference light such that a distance between a second surface of the wall part on a side opposite to the imaging object with respect to the first surface and a reference plane is equal to the thickness of the wall part, wherein the reference plane is a virtual plane perpendicular to an optical path of the illumination light and an optical path length of the illumination light to the virtual plane is equal to the optical path length of the reference light.

3. The imaging apparatus according to claim 2, wherein the signal processor set a region between an image of the first surface and a conjugate image of the second surface in the tomographic image obtained from the reflected light intensity distribution obtained in one imaging as an effective image region.

4. The imaging apparatus according to claim 3, wherein from a plurality of obtained detection results detected at mutually different focal depths with respect to the same imaging object, the signal processor obtains the reflected light intensity distribution near each focal point.

5. The imaging apparatus according to claim 2, wherein from a plurality of obtained detection results detected at mutually different focal depths with respect to the same imaging object, the signal processor obtains the reflected light intensity distribution near each focal point.

6. The imaging apparatus according to claim 5, wherein when the controller sets the focal depth such that the distance from the first surface to the focal point of the objective optical system is larger than the threshold value, the controller sets the optical path length of the reference light to satisfy a relationship:

$$(D+T)/2 < R < (D+2T)/2,$$

where T denotes the thickness of the wall part, D denotes the distance from the first surface to the focal point of the objective optical system and R denotes the distance from the second surface to the reference plane, which is a virtual plane perpendicular to the optical path of the illumination light, the optical path length of the illumination light to the virtual plane being equal to the optical path length of the reference light.

7. The imaging apparatus according to claim 1, wherein the threshold value is a half of the thickness of the wall part.

8. The imaging apparatus according to claim 1, further comprising a reference mirror which is arranged in the optical path of the reference light to specify the optical path length of the reference light, wherein
the controller includes;
a mirror driving mechanism which adjusts the optical path length of the reference light by changing the position of the reference mirror; and
a focusing mechanism which adjusts the focal depth by driving the objective optical system.

9. An imaging method for tomographically imaging an imaging object stored in a container having an optically transparent wall part, the imaging method comprising:
causing one branch light branched from low coherence light in a wide band emitted from a light source to be incident as illumination light on the imaging object via the wall part, detecting interference light generated by the interference of signal light obtained by condensing reflected light from the imaging object emitted via the wall part by an objective optical system and reference light generated from another branch light and outputting an interference signal corresponding to the detected interference light; and
obtaining a reflected light intensity distribution of the imaging object in an incident direction of the illumination light by Fourier-transforming a spectrum of the interference light based on the interference signal and generating a tomographic image from the reflected light intensity distribution, wherein a focal depth in the incident direction of the objective optical system on the imaging object and an optical path length of the reference light can be changed and, when the focal depth is set such that a distance from a first surface of the wall part on the side of the imaging object to a focal point of the objective optical system is smaller than a predetermined threshold value smaller than a thickness of the wall part, the optical path length of the reference light is set to a value equal to an optical path length of the illumination light to the first surface.

10. The imaging method according to claim 9, wherein the optical path length of the reference light is set such that a distance between a second surface of the wall part on a side opposite to the imaging object with respect to the first surface and a reference plane is equal to the thickness of the wall part, wherein the reference plane is a virtual plane perpendicular to an optical path of the illumination light and an optical path length of the illumination light to the virtual plane is equal to the optical path length of the reference light.

11. The imaging method according to claim 10, wherein a region between a conjugate image of the first surface and a conjugate image of the second surface out of the tomographic image obtained from the reflected light intensity distribution obtained in one imaging is used as an effective image region.

12. The imaging method according to claim 11, wherein a plurality of detections are performed for the same imaging object at focal depths different from each other and the optical path length is set for each setting of the focal depth.

13. The imaging method according to claim 10, wherein a plurality of detections are performed for the same imaging object at focal depths different from each other and the optical path length is set for each setting of the focal depth.

14. The imaging method according to claim 13, wherein when the focal depth is set such that the distance from the first surface to the focal point of the objective optical system is larger than the threshold value, the optical path length of the reference light is set to satisfy a relationship of:

$$(D+T)/2 < R < (D+2T)/2$$

where T denotes a thickness of the wall part, D denotes a distance from the first surface to a focal point of the objective optical system and R denotes a distance from the second surface to a reference plane, which is a plane perpendicular to an optical path of illumination light, an optical path length of the illumination light to the reference plane being equal to the optical path length of the reference light.

15. The imaging method according to claim 10, further comprising obtaining information on the thickness of the wall part before the optical path length of the reference light is set.

* * * * *